Dec. 28, 1926.  
J. A. DIENNER  
1,611,895  
POWER TRANSMISSION DEVICE FOR WASHING MACHINES AND THE LIKE  
Filed May 10, 1920   4 Sheets-Sheet 1

Inventor  
John A. Dienner  
By Brown Boettcher & Dienner  
Attorneys

Dec. 28, 1926.
J. A. DIENNER
1,611,895
POWER TRANSMISSION DEVICE FOR WASHING MACHINES AND THE LIKE
Filed May 10, 1920    4 Sheets-Sheet 2
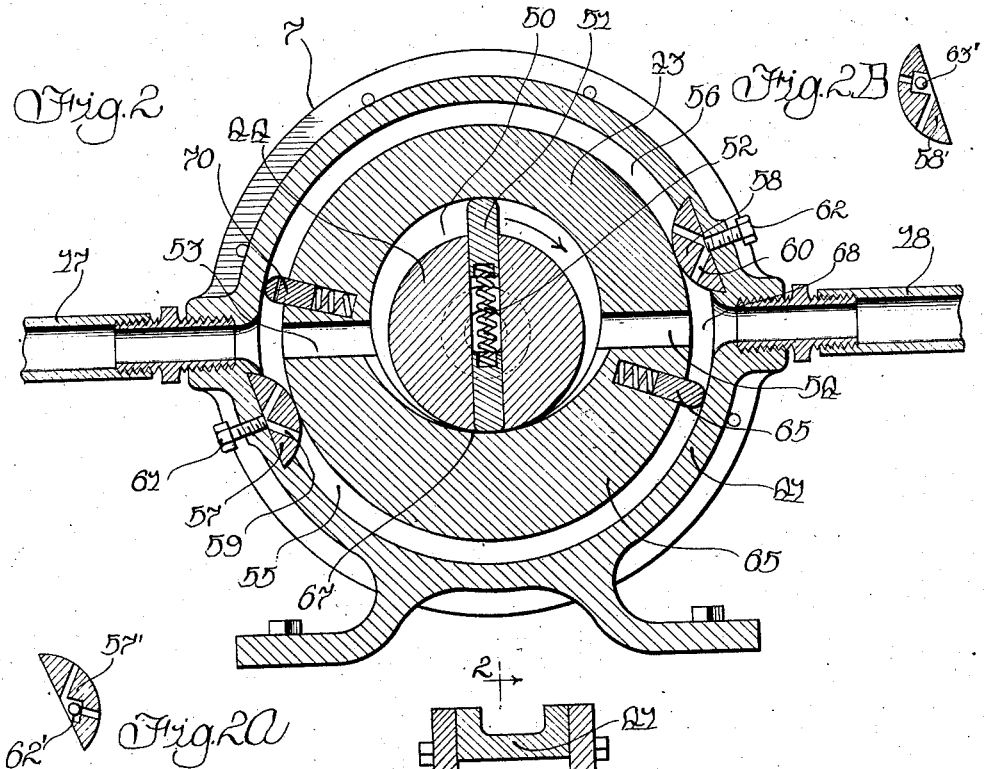
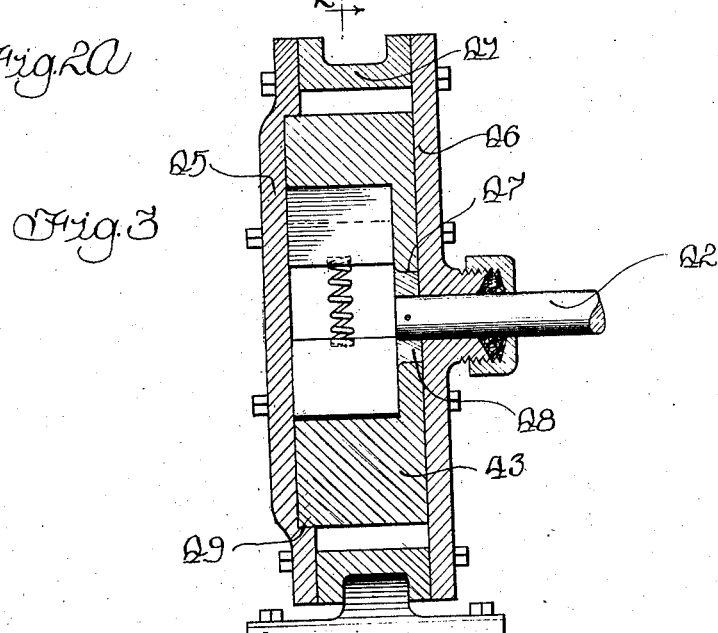
Inventor
John A. Dienner
By Brown Boettcher & Dienner
Attorneys

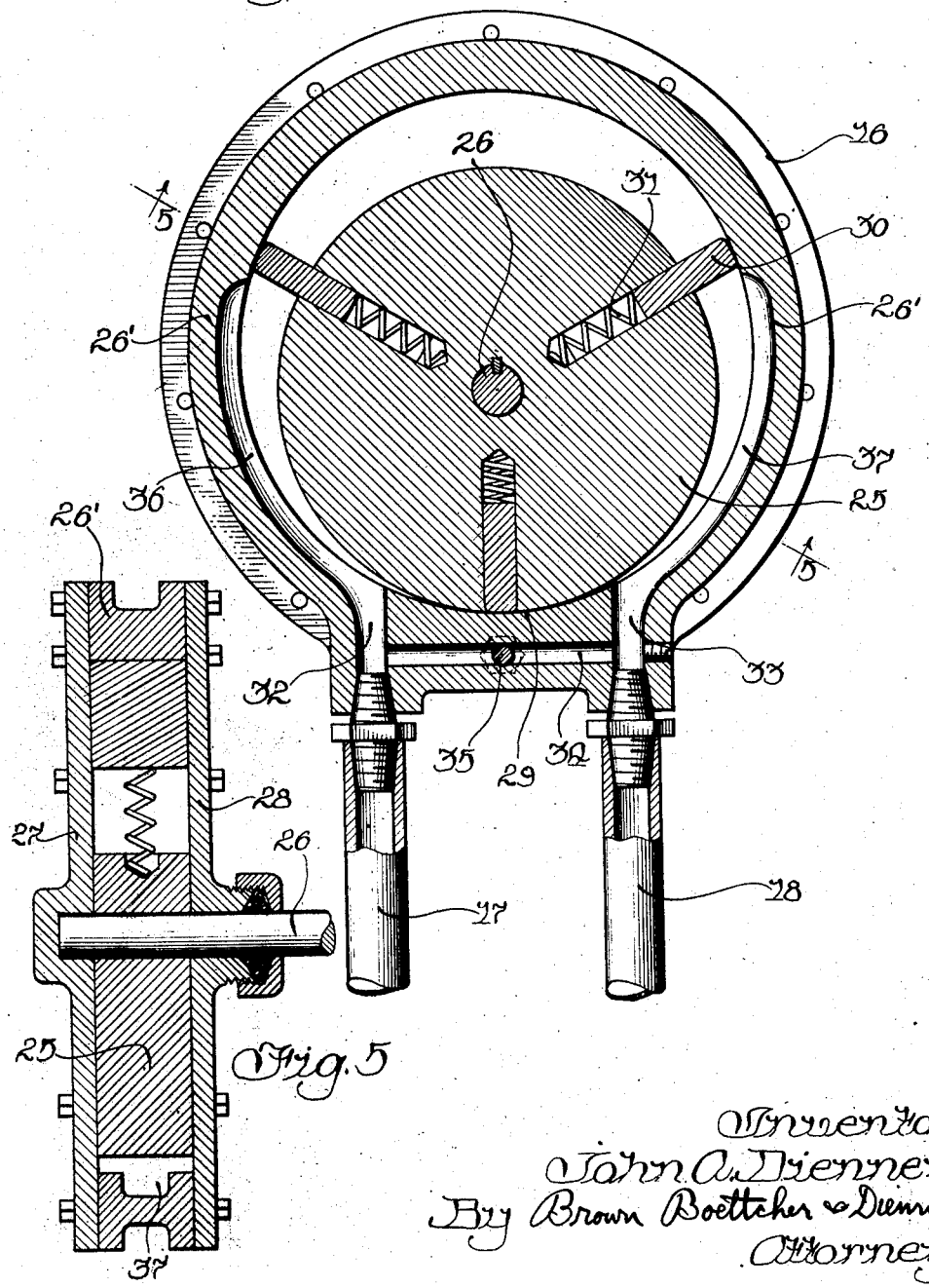

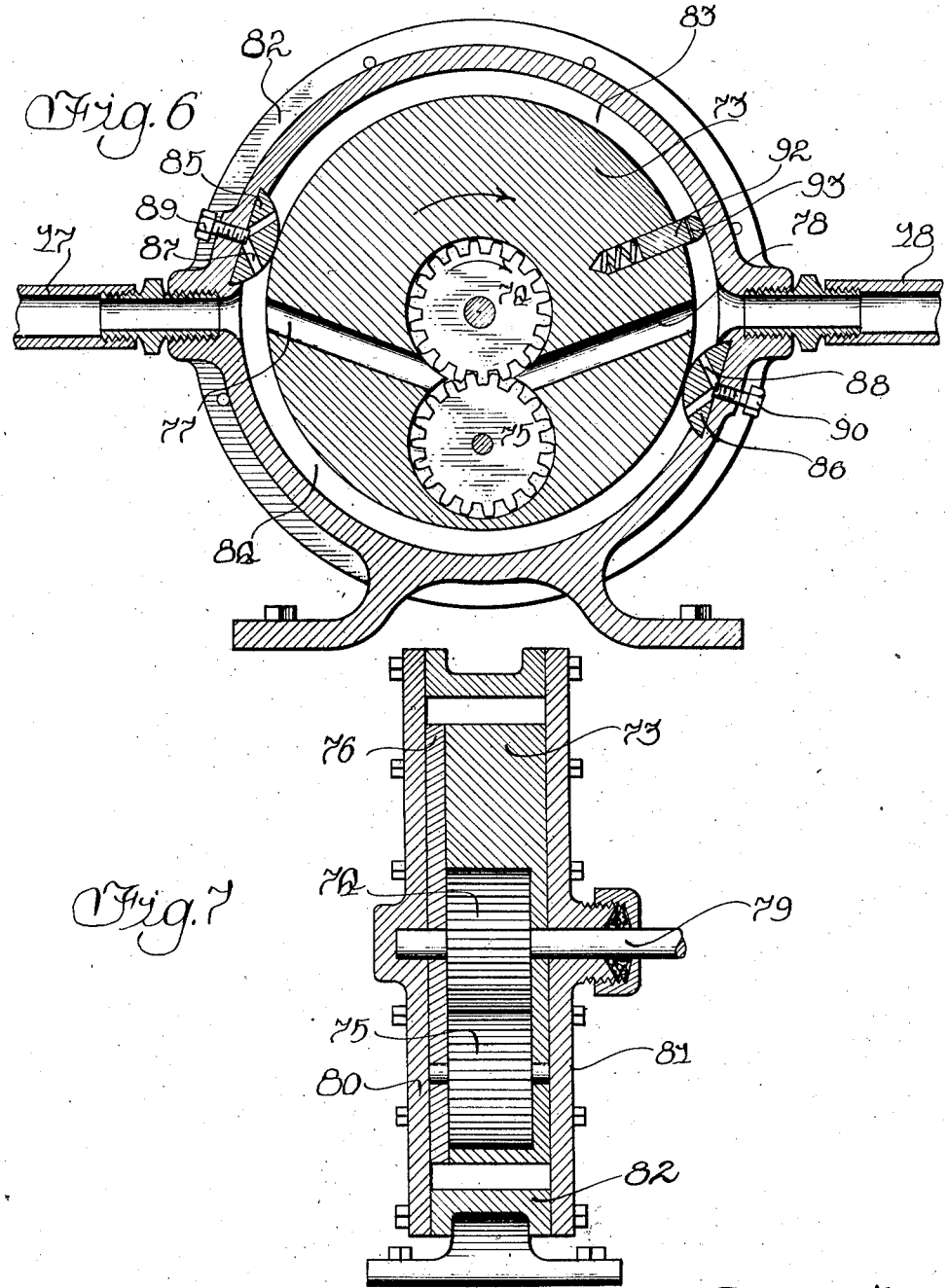

Patented Dec. 28, 1926.

1,611,895

UNITED STATES PATENT OFFICE.

JOHN A. DIENNER, OF CHICAGO, ILLINOIS.

POWER-TRANSMISSION DEVICE FOR WASHING MACHINES AND THE LIKE.

Application filed May 10, 1920. Serial No. 380,061.

My invention relates to power transmission devices for washing machines and the like.

While I shall describe the present invention in connection with the details of a washing machine and shall limit certain of the claims thereto, it is to be understood that the invention is not to be limited to use in washing machines only, as it will be apparent that certain of the combinations herein disclosed and claimed are applicable to use in other classes of machinery.

Heretofore it has been customary in operating washing machines from electric motors, as are commonly employed for this class of service, to employ mechanical reducing gears inasmuch as the usual motor speed is 1750 to 1800 R. P. M., while the motion of the reciprocatory or rotary part of a washing machine is usually less than 50 R. P. M.

One of the principal objects of the present invention is to provide a hydraulic form of power transmission device for washing machines, having as one of its numerous advantages the elimination of practically all difficulties involved in securing and maintaining accurate alignment between shafts and gearing, such as is necessary in gear transmission devices. A further advantage accruing to the use of this hydraulic transmission device is the elimination of substantially all noise characteristic of a gear drive, and the avoidance of numerous bearings which must be properly oiled and which are susceptible to wear in the prior forms of gear transmission devices.

A further advantage accruing to this hydraulic transmission mechanism is the facility of assembly, particularly by reason of the unit construction of the hydraulic pump and of the hydraulic motor. Hence, each unit can be assembled and mounted on the machine frame independently, being merely connected together by suitable fluid conduits.

Another advantage inherent in the present hydraulic transmission device is the absence of moving belts, gears, shafts and the like which are highly objectionable in a household machine, particularly where the clothing or the hands of the operator or attendant can readily be caught, or where children may come in contact with parts which may cause injury.

In my prior application Serial No. 364,832, filed March 10, 1920, I have disclosed and claimed a system of hydraulic transmission for washing machines and the like in which the above difficulties are minimized and in certain forms therein disclosed, entirely avoided. The present invention is an improvement upon the system of hydraulic transmission for washing machines which I have above mentioned.

In the present invention I provide a pumping element running at full motor speed, namely approximately 1800 R. P. M. This pumping element may operate constantly and since the same runs in oil it is not subject to wear or lack of oiling and if any part of the system becomes damaged or disarranged, each unit is separable and may be quickly taken down for independent repairs or replacement. I provide a machine which is easy to assemble, since the parts are of unit construction and easy to repair for the same reason. The noise which has been attendant to mechanical gearing is eliminated and a machine of surprising neatness and freedom from complicated mechanism is provided. In addition, the cost of assembly and of construction is greatly reduced by this invention.

The pumping element which I employ rotates constantly at motor speed and pumps the fluid, which is preferably a fairly thick grade of oil, constantly in one direction. I employ a reversing valve between the pumping element and the fluid motor element and in the present embodiment I form the valve as a rotary member constituting part of the pump itself. I do not intend, however, to limit the invention to the use of a rotary valve forming part of the pump, inasmuch as such a rotary valve may be connected anywhere in the fluid transmission system and operated either as in the preferred form by the pressure of fluid generated by the pump, or by some rotary part, such, for instance, as the pump or the fluid motor which is driven by the pump.

In the preferred form of the invention the rotary valve operates continuously in one direction, but my invention contemplates a rotary valve driven back and forth, by the alternation of fluid pressure as applied to the motor element. Such arrangement of rotary valve is disclosed in my above mentioned copending application.

Also in the preferred form the rotary valve is driven by a piston operated upon by fluid pressure, but it will be understood that in other forms which I have illustrated and disclosed the rotary valve is driven by the torque of the pump shaft.

In order to acquaint those skilled in the art with one specific manner of practicing and operating my invention I shall now describe in connection with the accompanying drawings a specific embodiment of the invention.

Figure 2 is a vertical cross section taken on the line 2—2 of Figure 3 of the pumping element and reversing valve;

Figures 2A and 2B are detail sectional views of modified dams employing check valves;

Figure 3 is a vertical axial section of the device shown in Figure 2;

Figure 4 is a vertical transverse cross section of the motor element;

Figure 5 is a section of the motor element taken on the line 5—5 of Figure 4;

Figure 6 is a vertical cross section similar to Figure 2 showing a modification; and Figure 7 is a view similar to Figure 3 of a vertical axial cross section of the device shown in Figure 6.

Figure 1:
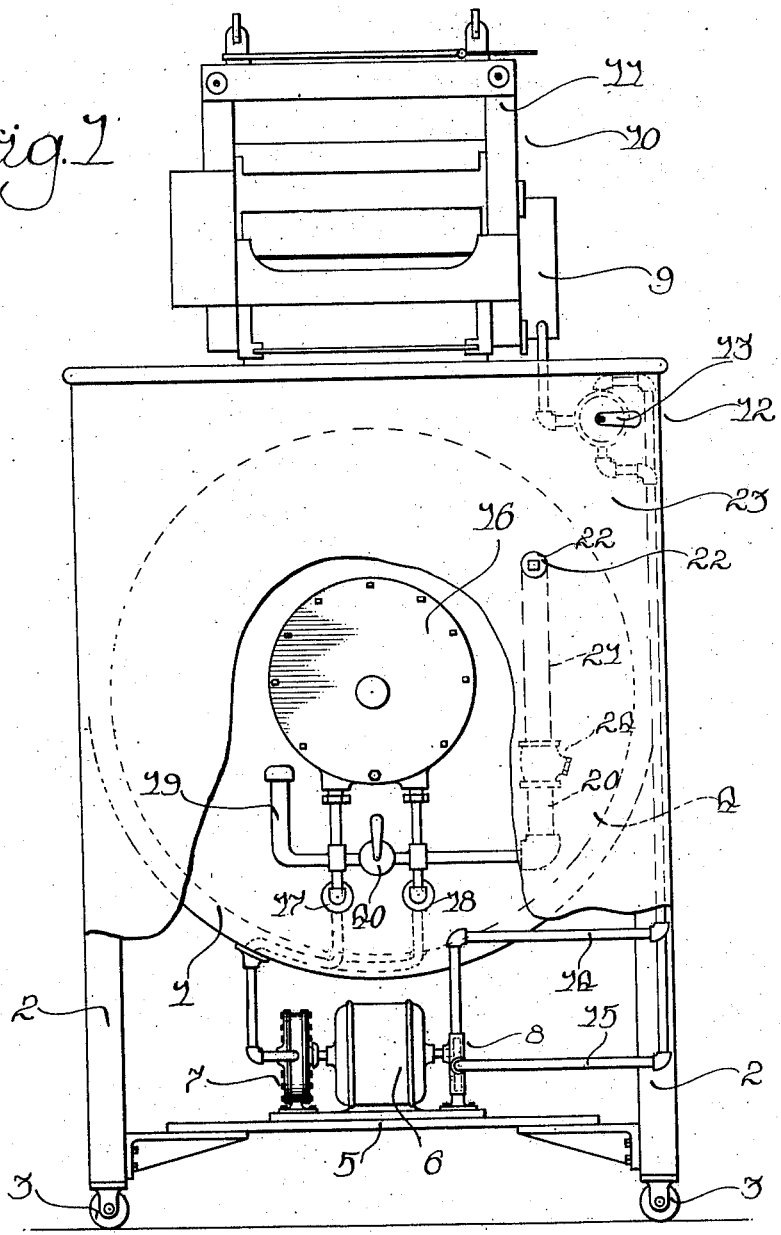
Figure 1 is a front elevational view with parts of the casing broken away, showing a washing machine embodying my invention.

In the form of machine which I have shown in Figure 1 I employ a tub 1, which is shown as mounted on suitable framework preferably made of angle bars, although this is not essential, with the legs or posts 2 at the corners for mounting the same upon suitable rollers or casters 3. This tub contains a washing drum shown in dotted lines at 4, the drum being adapted to be rotated for predetermined number of revolutions, preferably of the order of 6 to 8 revolutions in one direction and then the same number in the reverse direction. I provide a platform or base member 5, which is connected to the framework, preferably to the legs or posts 2, for mounting the electric motor 6 and the two pumping elements 7 and 8. The pumping element 8 is connected to a suitable motor element 9 for driving the wringer rolls 10, which are supported in a suitable framework 11 upon the top of the tub 1. The motor element 9 is of the same general character disclosed in Figures 4 and 5, being merely a rotary hydraulic motor adapted to be driven by the pressure generated by the pump 8. A control valve 12 provided with a suitable handle or operating member 13 controls the application and the direction of the liquid under pressure to the hydraulic motor 9. This valve 12 is a reversing valve and also a bypass to permit the wringer rolls to be driven in the desired direction or to be stopped at the will of the operator, as fully described in my above-mentioned copending application. The pump 8 and the motor 9 are connected to and through the valve 12 by suitable pipes 14 and 15. The pump 8 may be either a small gear pump or a vane pump, or in fact any desired type of positive rotary pump suitable for driving the hydraulic motor 9.

The washing drum 4 is driven by the hydraulic motor 16 which is illustrated in detail in Figures 4 and 5. This motor is connected by the pipes 17 and 18 to the automatic reversing pump 7 which is driven directly by the motor 6. The pipes 17 and 18 are provided with air cushions 19 and 20 respectively for easing the reversal of the motor 16. These air cushions are not essential and may be dispensed with. The air cushion 20 is extended upward at 21 and terminates in a filling plug 22 which may extend out through the front cover 23 so that oil may be introduced into the system if any is lost by leakage. A check valve 24 connects the extension 21 with the air cushion 20 so that the oil which is introduced in the extension 21 may flow into the system to replenish any deficiency. It will be appreciated at once that any leakage of oil which is replaced by air merely serves to make the system work more smoothly so long as there is sufficient oil in the system to permit of continued operation.

The hydraulic motor 16 may be of any desired type, which is reversible in operation by reversal of flow of the liquid therethrough. In the form which I have shown in Figure 4 I provide a rotary core 25 which is keyed to the operating shaft 26, this shaft being connected preferably directly to the shaft of the washing drum, as is well understood in the art. The core or rotary piston member 25 is enclosed in an eccentric housing member or cylinder 26' and the side plates 27 and 28 in such a manner as to make a close fit between the inner periphery of the cylinder as shown at 29 and the adjacent periphery of the core of piston member 25. The side plates fit against the flat ends of the core or piston member 25 so as to form a substantially fluid tight joint. The piston or core member 25 is provided with a plurality of pistons or vanes 30, these vanes being mounted in suitable slots and provided with springs 31 tending to throw the vanes or pistons out against the inner periphery of the cylinder.

The pipes 17 and 18 connect with suitable inlet passages 32 and 33 which serve alternately as admission and exhaust of the fluid which drives the rotary piston member 25. A bypass 34 for adjusting the speed of rotation of the piston member 25 connects the two passageways 32 and 33. This bypass is governed by a suitable needle valve 35 which may be set to permit a certain amount of leakage between the two passageways.

The inlet passageways 32 and 33 extend upwardly or around the inner periphery of the cylinder 26', the ends of these passageways or grooves 36 and 37 each extending to within approximately one third of the peripheral circumference of the cylinder. If a greater number of vanes or pistons 30 were employed, the peripheral distance between the ends of these grooves might be made less. The purpose of these grooves is to permit of easier passage of the fluid through the motor and to reduce the unit pressure which would otherwise rise to a relatively high value in proportion if the vanes 30 were permitted to block off the passageways 32 and 33 at too early a period in the movement of the same.

To control the operation of the washing drum I provide a valve 40 which serves merely as a complete bypass between the pipes 17 and 18 when it is desired to stop the operation of the hydraulic motor 16. The automatic reversing pump 7 comprises an outer cylinder member 41, which is concentric with the driving shaft 42, a rotatable pump cylinder and valve ring 43, a pumping piston member or rotor 44, and the end plates 45 and 46. The valve ring and pump cylinder 43 is mounted at 47 on a hub member 48 which is connected to the driving shaft 42. This serves as a bearing for said valve ring and pump cylinder for mounting the same concentrically with the shaft 42. The ring 43 is also mounted for rotation in the plate 45 as indicated at 49. The piston member or core 44 is mounted within the cylinder space 50 and is provided with the diametrical vane or vanes 51. In this case I have shown two vanes 51 separated at their centers and pressed outwardly by means of the spring 52. The shaft 42 and piston member 44 rotate constantly in the same direction. The valve ring 43, which also defines the cylinder space 50, has a passageway 53 which invariably forms the suction inlet, assuming that the piston rotates in clockwise direction, as shown in Figure 2. A similar passageway 54 serves invariably as a discharge from the pump and the valve action is effected by rotation or partial rotation of the ring member 43. The ring or plate 43 is mounted to rotate freely as will be explained later, and its rotating action is produced by two influences, one of which is the torque of the pump itself and the other of which is the pressure of the fluid created by the pump.

The annular space between the ring or plate 43 and the inner periphery of the outer casing 41 is divided into two compartments 55 and 56 by means of the stationary dams or wipers 57 and 58 which contact with the outer periphery of the ring or circular plate 43. These dams or wipers are provided with bypass openings 59 and 60 connecting the two cylinder or dash pot spaces 56 and 55. The bypasses are controlled by suitable valve members 61 and 62 which control the rate of rotation of the valve ring or plate 43. The bypasses in the dams 57 and 58 may be provided with check valves 62' and 63' as indicated in Figures 2^A and 2^B to prevent the escape of liquid under pressure, but to permit the escape of liquid in the direction of suction at all times.

I provide a vane or piston 65 which is mounted in a suitable slot in the ring or disk 43, this vane or piston operating in the dash pot cylinders 55 and 56 to control the rate at which the valve ring or disk 43 is driven forward. At the same time this piston member advances the valve ring so that reversals occur. The spaces 55 and 56 in addition to serving as dash pot cylinders, also serve as passageways communicating with the pipes 17 and 18. The vane or piston 65 is adapted to be held outwardly by a spring and is adapted to be moved inwardly against the pressure of said spring by means of the dams or wipers 57 and 58.

The operation of this automatic reversing pump is as follows: The shaft 42 of the automatic reversing pump is connected directly with the shaft of the electric motor 6 so that the pump shaft runs at the same speed as the motor armature. It will be understood that a suitable friction clutch may be interposed if desired for connecting and disconnecting these two shafts, but I have shown the same as directly connected and employ merely the by-pass valves 40 and 12 so that the pumps 7 and 8 may merely idle so long as the motor 6 is running and it is not desired to operate either the washing drum or the ringer roll. The rotor 44 is arranged to be continuously in contact with the bottom portion of the cylinder 50 so as to form a seal as indicated by the reference character 67. Assuming that the shaft 42 rotates in such a direction as to rotate the rotor 44 continuously in the clockwise direction as viewed in Figure 2 the blades or vanes 51 tend to draw liquid into the intake passageway 53 and to discharge the same at the discharge or outlet passageway 54 regardless of the position of these passageways with respect to the outer cylinder 41. In the position of the parts shown in Figure 2, liquid is drawn through the pipe 17 into the adjacent portion of the annular passageway 56 into the intake passageway 53 through the cylinder 50 and is discharged at the discharge passageway 54 into the pocket or trap portion 68 between the vane or piston 65 and the dam or sealing member 58. The dam or sealing member 58 is immovable, but the vane 65 is movable because the valve plate or ring 43 is mounted concentrically with the shaft 42 and is consequently adapted to be driven in the same direction of rotation as the shaft 42 by the fluid pressure upon the vane 65. The liquid which is discharged from the outlet passageway 54 into the pocket 68 passes out by way of the pipe 18 to the hydraulic motor 16 driving the hydraulic motor we will assume in a counterclockwise direction as shown in Figure 4. At the same time, the fluid pressure back of the vane 65 tends to force the valve ring or plate 43 around the shaft 42 as an axis so that the passageways 53 and 54 move together away from the direct registration with the pipes 17 and 18, but always in communication therewith thru the annular spaces or dash-pot passageways 56 and 55. The liquid which is trapped ahead of the vane 65 must be forced through the by-pass 59 and into the suction side where it will be taken up through the passageway 53.

It is an important feature of this form of the invention that in addition to the driving force furnished by the pressure of the liquid upon the vane 65, the torque of the pump itself tends to drive the cylinder and valve 43 forward in the same direction as that caused by the pressure of the liquid. Consequently, there will be a tendency for the valve ring to be moved more rapidly when the pressure is greater and consequently the reversals will tend to be more frequent. In order to overcome this, I provide a vane 70 which lies ahead of the suction passageway 53 and this vane is provided with a leakage passageway which controls the resistance that the vane 70 offers to the movement of the valve member 43 about the shaft 42 as an axis. Consequently, I am able to control the speed of rotation of the valve disc 43 to within fairly close limits, using the force of the liquid as well as the force of the pump to drive the valve disc around. This latter vane 70 serves solely as a retarding member and I may dispense with the same if desired. As soon as the vane 65 has advanced into contact with the dam or sealing member 57, this vane will be forced inwardly and since the resistance offered by the spring is very small, the vane 65 will pass over the dam 57 and at the same time, the vane 70 will pass over the dam 58 the force which drives the ring at this time being the torque of the pump itself. Consequently, the valve disc 43 will quickly move so that the vane 65 passes over the outlet connected to the pipe 17 and begins to trap the liquid in the space 56 where this operation will be repeated. Thus the discharge passageway 54 is brought into register with the pipe 17 and the suction passageway 53 is brought into register with the pipe 18 so that the liquid through the hydraulic motor 16 is now reversed, causing a reversal of direction of rotation of said motor, and consequently of the washing drum.

It will be understood that instead of having the vane pump 44 mounted in the valve disc 43, a gear pump or any other suitable type of rotary pump adapted for high speed work may be employed herein, the only essential feature being that the intake and outlet passageways be suitably arranged so that movement of the valve disc 43 will serve to reverse the condition of pressure and suction which will prevail in the pipes 17 and 18.

In the modification shown in Figures 6 and 7, I have shown an automatic reversing pump employing gears instead of a rotating vane piston for feeding the pressure and suction and instead of depending upon the pressure of the fluid to drive the valve ring or disc, I employ in this modification only the torque for furnishing such driving force. In this form of the device, I provide an inner valve plate or disc 73 which is adapted to receive the two gears 74 and 75 suitably seated within said disc. A cover plate 76 is provided for the ends of the gears so that these gears are sealed within their pockets having only the communication afforded by the intake passageway 77 and the outlet or discharge passageway 78. The valve ring or disc 73 and its cover plate 76 are mounted concentrically upon the driving shaft 79 which has bearings within the side plates 80 and 81, these side plates being connected to the flanges of the ring or cylinder 82 to form a suitable enclosure for the rotating valve members 73 and 76. The annular space between the valve members 73 and 76 and the ring or cylinder 82 is divided into two parts, namely 83 and 84 by means of the dam or sealing members 85 and 86. The pipe 17 communicates at all times with the passageway and dash-pot space 84 and the pipe 18 communicates similarly with the space 83. These dam or sealing members 85 and 86 are provided with passageways 87 and 88 controlled by the valve members 89 and 90 for regulating the leakage into and out of the dash-pot and passageway spaces 83 and 84. In this form of automatic reversing pump, the torque of a pump itself drives the valve disc member 73 in the same direction of rotation as the gears 74 and 75 and if no restraining means were provided, the tendency would be to spin the rotor 73 so that no effective pumping would occur. In order to hold the rotor 73 so that pumping may occur, I provide a vane 92 having a leakage port 93 therethrough, this vane being held outwardly by a spring.

Assuming that the direction of rotation of the gear 74 is in the direction of the arrow shown in Figure 6, namely, the clockwise direction, liquid will be taken in by way of the port 77 and discharged by way of the port 78. Consequently, the liquid will be discharged through the pipe 18 and drawn in through the pipe 17 moving the hydraulic motor in a counter-clockwise direction as shown in Figure 2. Assuming that the ports are in the condition shown in Figure 6, the rotation of the gears 74 and 75 tends to move the valve disc 73 in a clockwise direction, but the pressure of the fluid between the vane 92 and the dam 86 tends to drive the disc in the opposite direction, but the proportioning of the ports is such that the torque always prevails over the retarding force of the vane 93 and of the suction which tends to hold back the valve disc 73. The passageways through the dam members may be provided with check valves to prevent liquid being forced through them, but to permit the same to be drawn by suction in the opposite direction. This insures rotation of the pump and valve member in the desired direction. However, this is not essential and I have not shown the same on Figure 6. Assuming that the valve disc 73 moves forward until the port 78 is partially blocked by the dam 86 the resistance offered will increase sufficiently that the torque of the pump will throw the disc 73 very quickly over the dam 86 and at the same time will throw the vane 92 beyond the dam 86 until the vane 92 again assumes its dash-pot function and stops the further rotation of the disc 73 except at a slow rate. The result of this will be that the valve ports 77 and 78 will be reversed with respect to the pipes 17 and 18 so that the liquid will be discharged at the pipe 17 and drawn in at the pipe 18 whereby the direction of rotation of the hydraulic motor 16 will be reversed. It is to be understood that the drum of the washing machine will make approximately six to eight turns in one direction, and then a substantially equal number of turns in the opposite direction, although the fixed number of turns in each direction is not important.

In Figure 1, I have shown the pipes 17 and 18 as passing through the liquid contained within the drum, since I find that the continued operation of the device tends to heat up the oil contained in the system and I have, therefore, arranged these pipes to be in contact with the liquid inside of the washing cylinders so that the oil cannot become overheated.

I do not intend to be limited to the prescribed details of construction and arrangement shown and described, nor do I intend to limit the invention to the specific use to which I have put the same.

I claim:

1. In combination, a rotary pump for pumping fluid in one direction, a fluid driven element adapted for reversing motion, means connecting the pump and the driven element, a valve controlling the application of pressure alternately in opposite directions to said driven element and a movable piston member adapted to be driven by the fluid pressure delivered by the pump.

2. In combination, a rotary pump for pumping fluid in one direction, a fluid driven element adapted for alternating rotary motion, means connecting the pump and driven element, a rotary valve controlling the application of pressure alternately in opposite directions to said driven element and a movable rotary piston member adapted to be driven by the fluid pressure delivered by the pump.

3. The combination with a rotary element adapted to be driven with an alternating rotary motion of a hydraulic motor for driving said rotary element, said hydraulic motor being separate from said rotary element and being reversible, an electric motor, and an automatic pump connected with said hydraulic motor and being driven at the same speed as said electric motor.

4. The combination with a rotatable member adapted to be driven rotarily in one direction and then in the opposite direction, of a positively acting reversible fluid motor for driving said rotatable member, an electric motor adapted to run at approximately 1800 revolutions per minute, and an automatic reversing pump adapted to reverse the direction of fluid flow to said fluid motor after said fluid motor has made approximately five to ten turns in one direction.

5. The combination with a driven element, of a reversible fluid motor for driving said element, said fluid motor and element being adapted to be operated at less than 50 turns per minute, an automatic reversing pump having an impeller element operating substantially at 1800 revolutions per minute, said pump having means for automatically reversing the direction of fluid flow to said fluid motor upon the completion of from five to ten turns of the driven element.

6. In combination, a positively acting hydraulic motor for driving a washing element at less than 50 turns per minute, said motor being reversible, an electric motor operating at substantially 1800 revolutions per minute, an automatic reversing pump having a pumping element rotating at the speed of the electric motor and having an automatic reversing valve adapted to reverse the flow of liquid to said hydraulic motor substantially upon the completion of from five to ten turns of the hydraulic motor.

7. In combination a high speed driving motor, a driven element adapted to be driven first in one direction and then in another, a hydraulic motor for actuating said driven element, a rotary pump driven continuously by said driving motor and connected to said hydraulic motor, and a valve in the connection between the pump and the motor, said valve being moved by the pump.

8. In combination a high speed driving shaft actuated continuously in one direction, a low speed driven shaft adapted to be intermittently driven in one direction and then in another, a pressure actuated hydraulic motor having a piston and a cylinder for actuating said driven shaft, a pump connected to said hydraulic motor, said pump being driven continuously in one direction by said driving shaft and having an automatic valve forming a part of the same for reversing the direction of liquid flow to and from said hydraulic motor.

9. In combination a pump, a hydraulic pressure operated motor, a pair of closed pipes connecting said pump and said motor, each of said pipes alternately forming a delivery pipe from the pump to the motor and a return pipe from the motor to the pump and an automatic valve for periodically reversing the delivery of liquid from the pump with respect to said motor.

10. In combination a pump adapted to be driven continuously in one direction, a hydraulic pressure operated motor adapted to be driven alternately in one direction and then the other, a closed pressure system connecting said pump and motor and an automatic valve for periodically reversing the liquid flow through said system and the delivery of the pump to the motor.

11. In combination a pump comprising a casing member and a rotary pumping element, a hydraulic pressure operated motor, a pair of closed pipes connecting said pump and said motor, and an automatic valve lying between the rotary element and the casing of the pump for periodically reversing the liquid flow through said system and the delivery of liquid from the pump with respect to said motor.

12. In combination, a pump having a rotor, an outer casing element, a valve member having a cylinder for the rotor and controlling the discharge of liquid from the casing, a hydraulic pressure operated motor, a closed pressure system connecting said pump and said motor and means for driving the pump rotor continuously in one direction.

13. In combination a high speed driving shaft adapted to be driven in one direction, a low speed driven shaft adapted to be driven in one direction and then in the opposite direction, a pump comprising a rotary piston, a casing member and a valve member between the casing member and the rotary piston, a hydraulic pressure operated motor for driving the driven shaft, said motor being connected to the casing of the pump and said valve member being adapted to be rotated to reverse the connections of the pump with respect to the motor and the direction of liquid flow in the system.

14. In combination a driving shaft, a rotary piston connected to the shaft, a casing having a passageway for liquid serving alternately as inlet and outlet, a valve member forming a cylinder for the piston and having ports, one of said ports being an intake port and the other being a discharge port for the cylinder and means to cause rotation of the valve to change the connection of said ports with the passageway of the casing.

15. In combination a rotary piston, a casing having passageways serving alternately as inlets and outlets for liquid, a rotary valve member having a cylinder therein for said rotary piston and having ports, said ports comprising an inlet port and a discharge port and means for rotating the valve to place said ports alternately in communication with one of said passageways.

16. In combination a rotary piston, a ring member surrounding the same, said ring member having a cylinder therein for said rotary piston and having inlet and discharge ports for the cylinder, a casing surrounding said ring member, said casing having passageways adapted to cooperate with said ports and means operated by pressure of the pump for rotating said ring member to place the port alternately in communication with the passageway.

17. In combination a rotary piston, a ring member surrounding the same, said ring member having a cylinder for the piston and having inlet and discharge ports, a concentric casing having passageways and means for operating said ring member to put one of said ports alternately in communication with said passageways.

18. In combination a rotary piston, a ring member having a cylinder and having an inlet and a discharge port, a concentric casing having two passageways, dam members between the casing and the ring members and a vane carried by the ring member to move the ring member by hydraulic pressure generated by the rotary piston.

19. In combination a fluid pump, a fluid pressure motor, two closed pipes connecting the pump and the motor, each of said pipes alternately forming a delivery pipe from the pump to the motor and a return pipe from the motor to the pump, and a reversing valve mechanism for changing the connection of the pump with respect to the motor and the direction of liquid flow through said pipes.

In witness whereof I hereunto subscribe my name this 8th day of May, 1920.

JOHN A. DIENNER.